United States Patent
Bedier et al.

(10) Patent No.: US 9,754,136 B2
(45) Date of Patent: Sep. 5, 2017

(54) LOW-PROFILE CARD READER

(71) Applicant: Poynt Co., Palo Alto, CA (US)

(72) Inventors: Osama Bedier, Palo Alto, CA (US);
Ray Tanaka, Palo Alto, CA (US);
Robert Hernandez, Palo Alto, CA (US)

(73) Assignee: Poynt Co., Palo Alto, CA (US)

( * ) Notice: Subject to any disclaimer, the term of this patent is extended or adjusted under 35 U.S.C. 154(b) by 0 days.

(21) Appl. No.: 14/925,831

(22) Filed: Oct. 28, 2015

(65) Prior Publication Data

US 2016/0117529 A1    Apr. 28, 2016

Related U.S. Application Data

(60) Provisional application No. 62/069,742, filed on Oct. 28, 2014, provisional application No. 62/104,308, filed on Jan. 16, 2015.

(51) Int. Cl.
| | | |
|---|---|---|
| *G06K 7/08* | (2006.01) | |
| *G11B 5/105* | (2006.01) | |
| *G06K 7/00* | (2006.01) | |

(52) U.S. Cl.
CPC ............. *G06K 7/087* (2013.01); *G06K 7/00* (2013.01); *G06K 7/0021* (2013.01); *G06K 7/08* (2013.01); *G11B 5/105* (2013.01)

(58) Field of Classification Search
CPC ....... G11B 5/3103; G11B 5/31; G06Q 20/204
See application file for complete search history.

(56) References Cited

U.S. PATENT DOCUMENTS

| | | | | |
|---|---|---|---|---|
| 3,383,491 A | * | 5/1968 | Muncheryan | B23K 26/02 219/121.63 |
| 3,731,062 A | * | 5/1973 | Reilly, Jr. | G06K 7/10 235/470 |
| 3,809,826 A | * | 5/1974 | Rhodes | H04M 1/278 200/46 |
| 4,028,734 A | | 6/1977 | Mos | |
| 4,036,430 A | * | 7/1977 | Eppich | G06K 13/08 235/454 |
| 4,047,229 A | * | 9/1977 | Kobylarz | G11B 19/24 360/2 |
| 4,236,667 A | * | 12/1980 | Crowley | G06K 13/08 235/443 |
| 4,591,937 A | | 5/1986 | Nakarai et al. | |

(Continued)

FOREIGN PATENT DOCUMENTS

EP    2339505 A1    6/2011

OTHER PUBLICATIONS

JP, 11-016310, and A (1999) [Full Contents].*

*Primary Examiner* — Peter L Ludwig
(74) *Attorney, Agent, or Firm* — Jeffrey Schox; Diana Lin

(57) ABSTRACT

A low-profile card reader, including: a carriage; a single support arm including a first end statically mounted to the carriage, a second end, free from the carriage, a body tapering from the second end toward the first end, wherein the body is free from the carriage, such that the support arm freely deflects along a support arm length relative to the carriage, and a set of strengthening channels extending along the support arm length; and a magnetic reading head statically connected to the second end of the support arm.

15 Claims, 9 Drawing Sheets

(56) References Cited

U.S. PATENT DOCUMENTS

| | | | |
|---|---|---|---|
| 4,684,794 A * | 8/1987 | Holland-Letz | G06K 13/07 235/449 |
| 4,839,508 A | 6/1989 | Frolov | |
| 4,870,604 A * | 9/1989 | Tatsuno | G06K 7/0021 235/380 |
| 4,998,174 A | 3/1991 | Wada et al. | |
| 5,173,597 A | 12/1992 | Anglin | |
| 5,270,523 A | 12/1993 | Chang et al. | |
| 5,294,782 A * | 3/1994 | Kumar | G06K 7/10881 235/380 |
| 5,311,003 A * | 5/1994 | Saroya | G06K 7/015 235/440 |
| 5,321,243 A | 6/1994 | Groves et al. | |
| 5,557,089 A * | 9/1996 | Hall | G06K 7/0004 235/440 |
| 5,559,317 A * | 9/1996 | Wong | G06K 13/0831 235/449 |
| 5,912,446 A * | 6/1999 | Wong | G06K 13/0831 235/449 |
| 6,021,948 A * | 2/2000 | Tsai | G06K 7/0004 235/440 |
| 6,293,464 B1 * | 9/2001 | Smalley, Jr. | G06K 7/0008 235/435 |
| 6,312,175 B1 * | 11/2001 | Lum | G06F 3/021 400/472 |
| 6,382,508 B1 * | 5/2002 | Bleier | G06K 13/08 235/441 |
| 6,457,648 B1 * | 10/2002 | Chen | G06K 7/0004 235/449 |
| 6,480,356 B1 | 11/2002 | Mos et al. | |
| 6,487,046 B1 * | 11/2002 | Oguchi | G11B 5/4826 235/449 |
| 6,579,728 B2 * | 6/2003 | Grant | G06K 7/084 438/3 |
| 6,769,607 B1 * | 8/2004 | Pitroda | G06K 7/0013 235/380 |
| 7,350,705 B1 * | 4/2008 | Frederick | G06K 7/0021 235/439 |
| 8,025,219 B2 * | 9/2011 | Henry | G06K 7/0004 235/380 |
| 8,550,347 B2 | 10/2013 | Ikeda et al. | |
| 9,141,835 B1 * | 9/2015 | Weber | G06K 7/082 |
| 2003/0222135 A1 * | 12/2003 | Stoutenburg | G06Q 20/04 235/379 |
| 2004/0058705 A1 * | 3/2004 | Morgan | G06Q 20/341 455/556.1 |
| 2004/0262382 A1 * | 12/2004 | Miyaji | G07F 1/02 235/380 |
| 2005/0073584 A1 * | 4/2005 | Enright | G06Q 20/18 348/150 |
| 2005/0219728 A1 * | 10/2005 | Durbin | G06K 7/084 360/46 |
| 2007/0188333 A1 * | 8/2007 | Clancy | G08B 13/246 340/572.9 |
| 2008/0126260 A1 * | 5/2008 | Cox | G06Q 20/20 705/67 |
| 2011/0174926 A1 * | 7/2011 | Margis | B60N 2/4876 244/118.6 |
| 2011/0198395 A1 * | 8/2011 | Chen | G06K 7/084 235/380 |
| 2012/0118959 A1 | 5/2012 | Sather et al. | |
| 2012/0126013 A1 | 5/2012 | Sather et al. | |
| 2012/0222935 A1 * | 9/2012 | Mackay | G07F 17/248 194/210 |
| 2012/0228380 A1 * | 9/2012 | Ikeda | G06K 7/0004 235/440 |

\* cited by examiner (section A-A)

LOW-PROFILE CARD READER

CROSS-REFERENCE TO RELATED APPLICATIONS

This application claims the benefit of U.S. Provisional Application No. 62/069,742 filed 28 Oct. 2014, and 62/104,308 filed 16 Jan. 2015, which are incorporated in their entireties by this reference.

TECHNICAL FIELD

This invention relates generally to the card reader field, and more specifically to a new and useful hybrid card reader in the card reader field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
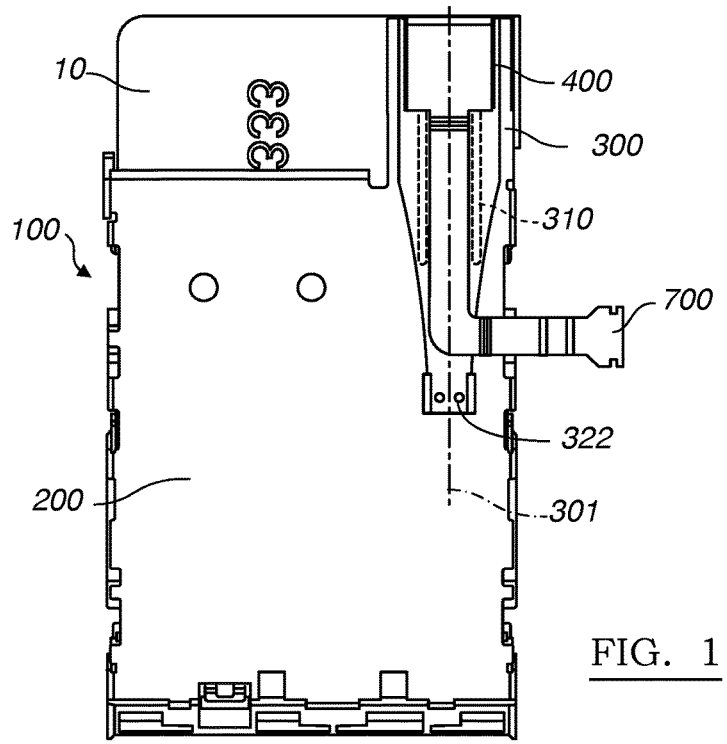
FIG. 1 is a view of a first variation of the card reader from the first broad face.

As shown in FIG. 1, the low-profile card reader 100 includes: a carriage 200, a support arm 300, and a magnetic reading head 400 mounted to the support arm 300. The card reader 100 functions to read information from a card with a magnetic stripe (e.g., credit card, gift card, etc.). The card reader further functions to provide this functionality in a low-profile form factor (e.g., a thin form factor, such as less than 8 mm thick). The low-profile card reader is preferably incorporated within a point of sale system (POS system), but can alternatively be used in a stand-alone magstripe reader (e.g., connected to a POS terminal through a wire, smartphone jack, or wireless connection), any suitable payment terminal (e.g., smart payment terminal, etc.), or be used in any other suitable manner.

1. Specific Examples of the Card Reader.

In a first specific example, the low-profile card reader 100 includes a carriage 200, a magnetic reading head 400, and a single cantilevered support arm 300. The single cantilevered support arm 300 is preferably substantially planar, and includes: a first end 320, statically mounted to the carriage 200; a second end 340, free from the carriage 200, that statically mounts the magnetic reading head 400; a body 390, tapering from the second end toward the first end, wherein the body 390 is free from the carriage 200 such that the support arm 300 freely deflects along a support arm length relative to the carriage 200; and a set of strengthening channels 312 extending along the support arm length. The strengthening channels 312 are preferably defined with the openings along the same support arm face, but can alternatively be defined with the openings along opposing support arm faces or be defined in any suitable configuration.

In the first specific example, the card reader 100 can additionally include: a casing (housing 500) defining a card opening 520, wherein the card insertion vector 102 (card insertion direction) is perpendicular the card opening 520. The casing 500 can additionally enclose the carriage face to which the support arm 300 is mounted, and can be configured such that the casing can restrict support arm deflection away from the carriage. Alternatively, the spring force of the support arm 320 itself can limit support arm deflection away from the carriage 200. The support arm 320 is preferably arranged with a longitudinal axis (e.g., the support arm length) perpendicular the card opening (e.g., parallel the card insertion vector), such that card insertion into the card opening 520 deflects the support arm 300 away from the carriage 200. The support arm 300 is preferably mounted such that the leading edge of the magnetic reading head (e.g., the portion of the magnetic reading head that encounters the card 10 first, during card insertion) and/or the second end of the support arm is proximal or abutting the card opening. In a specific variant, the card reader lacks a second support arm between the magnetic reading head 400 and the card opening 520, such that the magnetic reading head is freely suspended on a single arm. However, the support arm and magnetic reading head can be otherwise arranged relative to the card opening. In this example, the card reader can additionally include a ramp (e.g., defined by the casing or carriage), arranged opposite the tracks of the magnetic reading head, that functions to guide card insertion into the card reader and to bias the card against the magnetic reading head tracks (e.g., to promote contact between the tracks and the magnetic stripe).

Figure 2:
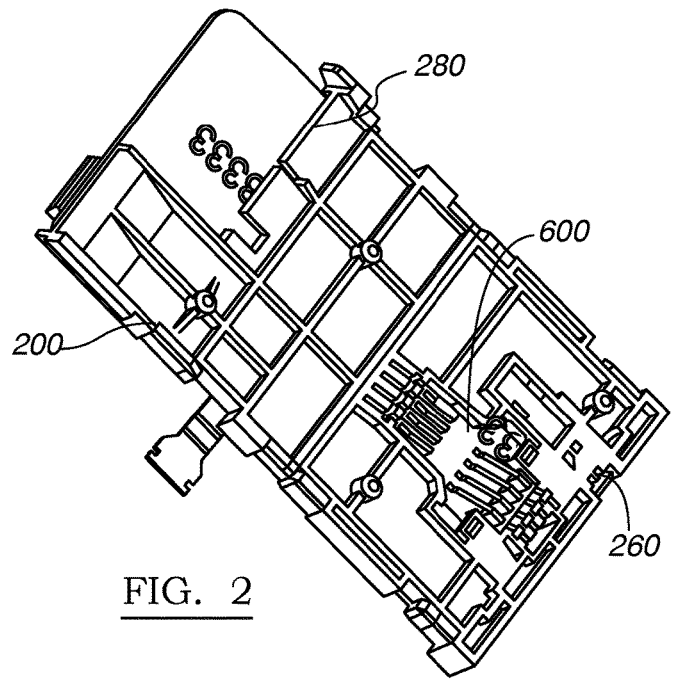
FIG. 2 is a view of the first variation of the card reader from the second broad face.

In a second specific example, as shown in FIG. 2, the card reader 100 is substantially similar to the first specific example, and further includes an integrated circuit chip reader 600 (IC chip reader), such that the card reader 100 functions as a hybrid card reader. This hybrid card reader functions to selectively read information from the magnetic stripe and/or the integrated circuit chip of a card (e.g., a credit card). In this example, the carriage is configured to encapsulate a card along its width, and includes a first carriage component 220 and a second carriage component 240 (opposing the first) cooperatively defining a card receptacle 230 therebetween. The card receptacle 230 is preferably contiguous with the card opening 520 of the casing, but can alternatively be otherwise arranged. The casing or carriage can additionally define an entirely or partially closed card obstruction end 290 opposing an opening to the card receptacle (card receptacle opening), wherein the card obstruction end functions to prohibit (e.g., obstruct) further card insertion (e.g., further card traversal along the card insertion vector). The support arm 300 is preferably mounted to the first carriage component proximal the card receptacle opening (e.g., along the first carriage component body or edge), and the IC chip reader 600 is preferably mounted to the second carriage component proximal the card obstruction end (e.g., along the second carriage component body). The card reader can additionally include a card detection pin 260 (e.g., switch, etc.) mounted to carriage along card obstruction end, which functions to verify that the card has been fully inserted into the card reader.

In one example of card reader operation, the hybrid card reader of the second specific example can be used with a card having a magnetic stripe and/or an integrated circuit chip (IC chip). In this example, the hybrid card reader can: read information from the card's magnetic stripe; determine whether the card has an IC chip; and/or read information from the card's IC chip through the same card insertion motion. In a first specific example of card reader operation, the card reader can read information from the card's magnetic stripe, with the magnetic reading head, as the card is being slid into the card reader. The card reader can read information from the IC chip with the IC chip reader in response to IC chip reader contact with the IC chip, and/or in response to determination that the card has been fully insertion into the card reader (e.g., when the card detect pin is triggered). When information is read from the IC chip and the magnetic stripe information was read prior, the magstripe information can be discarded or be otherwise used. Alternatively, the card reader can: determine whether an IC chip is present on the card during or after full card insertion; read information from the chip if the chip is present; and read information from the magstripe during the card retraction motion if the chip is not present. However, the hybrid card reader can function in any other suitable manner.

In a third specific example, the first and/or second specific example of the card reader is incorporated into a point of sale system 110 (POS system). The POS system can additionally include: a secured processor 112 (e.g., a processor whose hardware and software have been certified by a certifying entity, such as PCI or EMV) and a flex cable 700 connecting the magnetic reading head 400 and/or IC chip reader 600 to the secured processor 112. The flex cable 700 can additionally include a security mesh (e.g., digital or analog) that functions to guard against flex cable tampering. The POS system 110 can additionally include an input device 114 (e.g., a touchscreen), an output device 113 (e.g., a display corresponding to the touchscreen), or any other suitable component. Examples of POS systems that can incorporate the card reader include the POS systems disclosed in U.S. application Ser. No. 14/743,356 filed 18 Jun. 2015 (e.g., wherein the card reader is arranged parallel to the main or secure display), and U.S. application Ser. No. 14/526,112 filed 28 Oct. 2014, incorporated herein in their entireties by this reference, but can alternatively include any other suitable POS system. However, the low-profile card reader can be used in any other suitable application in any suitable manner.

In a fourth specific example, the card reader 100 consists essentially of the carriage 200, magnetic reading head 400, and a single support arm 300 including a first end mounted to the carriage and a second arm, free from the carriage, that mounts the magnetic reading head.

In a fifth specific example, the card reader 100 can be a manual push-pull reader with a normally-open card detection switch (e.g., card detection pin), configured to have a card insertion force less than 10 N, a card extraction force of more than 1 N, a durability of at least 500,000 cycles, and a 95% MSR card read length. However, the card reader can be otherwise configured.

2. Benefits

This card reader configuration can confer several benefits over conventional card readers. First, the configuration minimizes card reader thickness by using a flexible, cantilevered support arm (e.g., a leaf spring, a cantilevered leaf spring) to bias the magnetic reading head against the card, instead of using a conventional spiral or wound spring. The configuration also minimizes card reader thickness by arranging the support arm parallel to the card insertion direction, instead of using the conventional spring arrangement in which the spring is arranged with the compression vector along the reader thickness (e.g., perpendicular to the card insertion direction). While this configuration could lead to increased jitter (e.g., lateral movement), decreased accommodation of warped cards (e.g., due to less magnetic reading head rotation or torsion permitted about the card insertion axis), the inventors have discovered that some torsion and jitter can be sacrificed without decreasing card reader performance for the majority of the user population. The configuration can also minimize card reader thickness by decreasing the deflection angle permitted to the magnetic reading head, such that less deflection space is required from the casing. While this could make card insertion more difficult, the inventors have discovered that large head deflections can be sacrificed by improving card insertion guidance mechanisms (e.g., ramps). In some variants, the card reader can be less than 8 mm thick, less than 6 mm thick, or less than 5 mm thick. However, the card reader can have any suitable set of dimensions.

Second, this card reader has less parts than conventional card readers. In a basic variant, the card reader can include only four components: the carriage, the magnetic reading head, and the support arm. This low part count can decrease cost and decrease assembly complexity. However, this configuration can confer any other suitable set of benefits.

3. Components

The carriage 200 of the card reader 100 functions to support the card reader components. The carriage (e.g., chassis) can additionally function to guide card insertion along the card insertion vector, function as a lever point for the support arm, function to dissipate strain from the support arm mounting point (e.g., during support arm deflection), function to dissipate heat from the magnetic read head (e.g., as a heat sink), or perform any other suitable functionality. The carriage can define a longitudinal axis (e.g., extending along the carriage length) and a lateral axis (e.g., extending along the carriage width). The carriage is preferably arranged within the card reader with the longitudinal axis substantially perpendicular the card opening or card insertion vector (e.g., the lateral axis or card receptacle opening substantially parallel the card opening or card insertion vector), but can alternatively be arranged within the card reader with the lateral axis substantially perpendicular the card opening or card insertion vector (e.g., the longitudinal axis or card receptacle opening substantially parallel the card opening or card insertion vector), or be arranged in any suitable configuration.

The carriage 200 can be configured as a substantially planar structure, as defining a groove or trough (e.g., with a first and second open end), as a pocket (e.g., defining an open end opposing a closed end) or have any suitable configuration. In a first variation, the carriage is a bar, rail, tress, or any other suitable substantially planar structure, wherein the card slides parallel to the carriage plane. In a second variation, the carriage includes a first and second opposing broad face cooperatively defining a card receptacle therebetween (e.g., a lumen) that is configured to receive all or a portion of a card. The support arm preferably mounts the magnetic reading head to the first broad face of the carriage, but can alternatively mount the magnetic reading head to the second broad face, mount the magnetic reading head to a sidewall, or mount the magnetic reading head to any other suitable portion of the carriage. However, the carriage can have any other suitable configuration.

When the carriage 200 defines a card receptacle 230, the carriage can additionally define a carriage opening 280 (e.g., card receptacle opening) along a first end (e.g., card opening end, carriage opening end). The carriage opening can be the card opening (e.g., independently defined or cooperatively defined by the card reader housing) or be a separate and distinct opening. The carriage opening can be parallel to the card opening, perpendicular the card insertion vector, or be otherwise arranged. The carriage can include a single carriage opening (e.g., wherein the carriage end opposing the carriage opening is closed, thereby defining a card obstruction end 290), two carriage openings (e.g., wherein the carriage end opposing the carriage opening is open), or any suitable number of carriage openings. The opposing end can be parallel to the carriage opening, at a non-zero angle to the card opening, or be otherwise arranged.

The carriage 200 can additionally include one or more sidewalls connecting the first and second broad faces. In a first variation, the carriage includes one sidewall extending between the carriage opening and opposing end, wherein the carriage receptacle is open on at least two contiguous sides. When the opposing end defines a carriage opening, the carriage receptacle can be open on three sides. In this variation, the carriage can be configured to enclose less than the entirety of the card width and/or length during card insertion. In a second variation, the carriage can include two opposing sidewalls extending between the carriage opening and opposing end, such that the carriage receptacle encloses the lateral or longitudinal carriage axis. In this variation, the carriage can be configured to enclose the entirety of the card width and/or length during card insertion. In one specific example of the variation, the carriage profile (e.g., cross section normal to the thickness) has dimensions of 91 mm by 57 mm, and the carriage thickness can be 4.5 mm, wherein the carriage is configured to receive an ID-1 card having profile dimensions of 85.60 mm by 53.98 mm, with a thickness of 0.76 mm. However, the carriage can have any other suitable configuration or set of dimensions, and be configured to receive any suitable card type (e.g., ID-2, ID-3, ID-000).

The carriage 200 can be formed from a singular piece (e.g., bent, stamped, molded, or otherwise formed), be formed from a first and second carriage component (220 and 240 respectively, e.g., wherein the first and second carriage component form the first and second broad faces, respectively, and cooperatively define the card receptacle 230 therebetween), be formed from three carriage components (e.g., wherein the first face is formed by a first and second component, and the second face is formed by the third), or be formed from any suitable number of components. However, the carriage can be constructed in any other suitable manner. When the carriage is formed from multiple components, the components can be welded, screwed, bolted, or otherwise coupled together. The carriage components can be statically coupled together, movably coupled together (e.g., wherein one component can rotate or slide relative to another), or be otherwise coupled together. The carriage can be formed from plastic, metal (e.g., stainless steel, copper, etc.), ceramic, a combination thereof, or any other suitable material. The thicknesses of the first and second broad faces can be substantially similar or different.

In a specific example, the carriage 200 can be formed from three pieces: a mounting shell, a backing, and an IC shell. The mounting shell forms the first broad face of the carriage, and the backing and IC shell cooperatively form the second broad face of the carriage. Tabs of the mounting shell preferably extend along the sidewalls to interlock to the second broad face of the carriage, but the components can be otherwise coupled together. The mounting shell is preferably metal while the backing and IC shell are plastic, but the components can be formed from any other suitable material.

Figure 3:
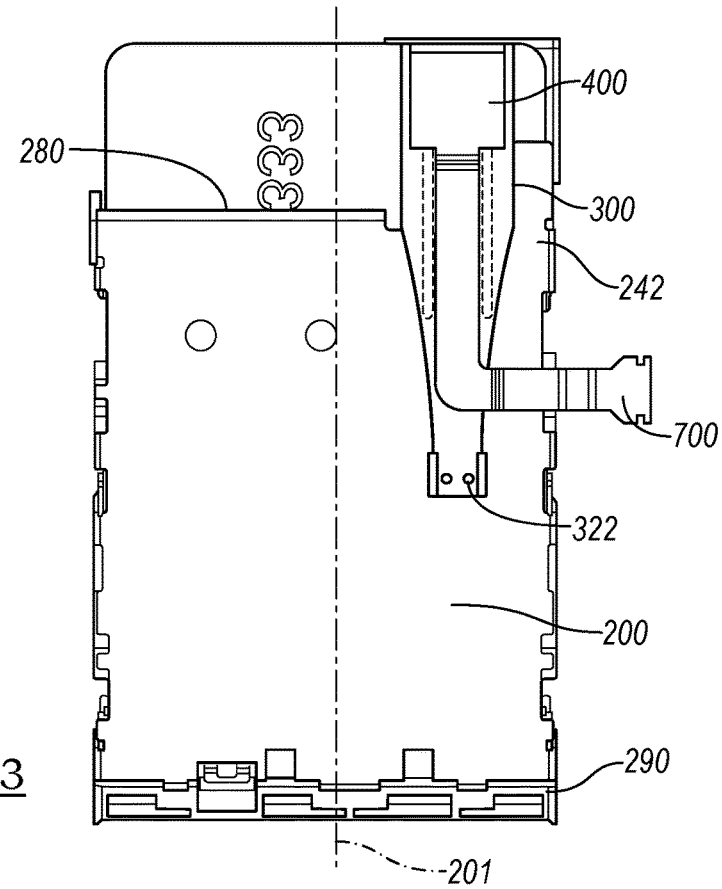
FIG. 3 is a view of a second variation of the card reader from the first broad face.
Figure 4:
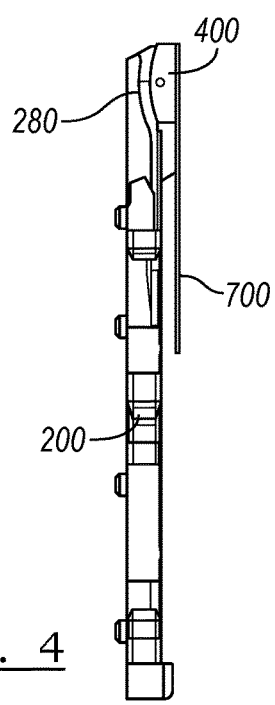
FIG. 4 is a side view of the second variation of the card reader from a first side.
Figure 5:
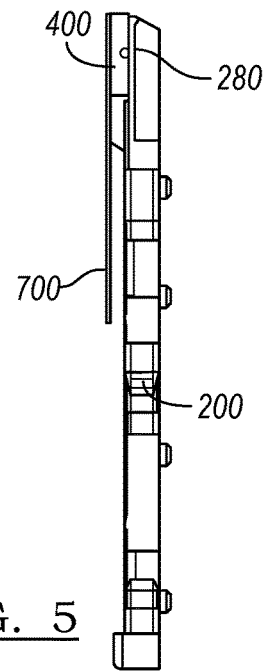
FIG. 5 is a side view of the second variation of the card reader from a second side.

The geometry of the carriage 200 (e.g., carriage profile, perimeter, etc.) is preferably rectangular, but can alternatively be a gnomon (e.g., a six-sided figure that remains of a parallelogram after a similar but smaller parallelogram has been removed from one of its corners), an oval, a polygon, or have any other suitable profile. In one example, the second broad face can include an extension 242 opposing the support arm (e.g., such that the second broad face forms a gnomon). The profile of the first broad face can be rectangular, be a gnomon mirroring the second broad face, or have any other suitable configuration. In one example in which the profile of the first broad face forms a gnomon, the extension and/or first broad face of the body can include a cutout to accommodate for the support arm, such that the support arm is arranged within the cutout and is substantially coplanar with the first broad face (examples shown in FIGS. 1 and 3). In this example, the extension can form a first and second arm that laterally bounds the support arm to prevent yaw (e.g., about a normal vector to the support arm plane). The variation with gnomon-shaped first and second broad faces can be preferred in some cases, as the space left by the cutout (e.g., the smaller parallelogram removed from the otherwise rectangular profile) can function as a card access point for user card handling (e.g., leaves a space for the user to grab the card). However, the carriage can include any suitable geometry.

The carriage 200 is preferably substantially planar (e.g., wherein "substantially," as used herein, can be within a margin of error, such as within 5% or 10% of the preferred value), but can alternatively be wavy, angled, or have any suitable planarity. The carriage can include internal features extending into the carriage receptacle, such as cooling features, card guide rails, ramps, or any other suitable internal feature. In one example, the portion of the second broad face proximal the tracks of the magnetic reading head defines the ramp 244 discussed below, wherein the ramp 244 is defined with the foot proximal to or along the carriage opening, and the top of the ramp arranged proximal the trailing edge of the magnetic reading head (e.g., further away from the carriage opening than the magnetic reading head, substantially aligned with the trailing edge, etc.). However, the carriage can have any suitable planarity.

The support arm 300 of the card reader 100 functions as a spring member that biases the magnetic reading head against a card. The support arm (e.g., elongated support arm) is preferably capable of deflecting along its length (e.g., pitching) and/or torquing about its length (e.g., rolling, to accommodate for different card entry angles or warped cards), but can additionally yaw (e.g., about a support arm neck or about a support arm mounting point), or actuate in any suitable manner. The support arm is preferably passive, but can alternatively be actively controlled (e.g., be a shape-memory alloy, such as Nitinol, that changes between a first and second configuration upon heat or voltage application).

The support arm 300 is preferably mounted to the carriage 200, and preferably mounts the magnetic reading head 400. The support arm can additionally mount the flex cable, or support any other suitable component. However, the support arm can be otherwise arranged relative to other card reader components. The support arm is preferably formed from a single layer of material, but can alternatively be formed from multiple layers of the same or different material. In one example, the support arm can function as the security mesh, wherein the flex cable is defined along the support arm interior. The support arm is preferably made of metal, but can alternatively be made of plastic or any other suitable material. The support arm and features thereon can be stamped, molded, assembled, or otherwise manufactured. Each card reader preferably includes a single support arm, but can alternatively include multiple. When multiple support arms are included, the support arms are preferably arranged along the same plane (e.g., are coplanar), but can alternatively be stacked along a vector normal to the support arm plane or be arranged in any other suitable configuration. Multiple arms can be arranged in the same direction (e.g., with the magnetic reading heads arranged in the same direction), arranged in different directions (e.g., opposing directions, at non-zero angles, etc.), or be arranged in any other suitable relative arrangement.

The support arm 300 is preferably mounted to the first carriage component but alternatively the second, or to any other suitable carriage component, but can alternatively be mounted to the housing or to any other suitable card reader component. The support arm can be statically mounted (e.g., at the mounting point) to the mounting substrate, actuatably mounted to the mounting substrate (e.g., such that the support arm can move about a joint or other interface relative to the mounting substrate), or be otherwise mounted to the mounting substrate. The support arm can be mounted with welds 322 (e.g., laser welds or any other suitable weld, applied to the first or second broad face of the support arm), solder, screws, or mounted using any other suitable mounting mechanism. The first end of the support arm is preferably mounted to the carriage, with the second end and body free from the carriage. Alternatively, the second arm, the body, and/or portions of the body can be mounted to the carriage. The support arm is preferably mounted offset from the central carriage longitudinal axis 201, but can alternatively be mounted coaxially with the central carriage longitudinal axis or in any other suitable position. The support arm is preferably mounted with the first end arranged partway along the carriage length (e.g., such that all or a portion of the support arm is coextensive with the carriage), but can alternatively be mounted proximal a carriage end (e.g., the carriage opening end or card obstruction end). The support arm is preferably mounted to the carriage exterior, but can alternatively be mounted to the carriage interior. The support arm is preferably mounted to a carriage broad face, but can alternatively be mounted to a carriage side or to any other suitable portion of the carriage. However, the support arm can be otherwise mounted to the carriage.

The support arm 300 is preferably mounted to the carriage with the second end of the support arm proximal the carriage opening (e.g., the first end of the carriage), but can alternatively or additionally be mounted to the carriage with the second end proximal the card opening, with the first end proximal the carriage opening, with the first end mounted to an intermediary point along the carriage body, or be mounted in any other suitable arrangement. The support arm is preferably mounted with the support arm longitudinal axis (e.g., length) substantially parallel the carriage longitudinal axis, but can alternatively or additionally be mounted such that the support arm longitudinal axis is substantially parallel the card insertion axis, the magnetic track axis, the reading axis, or arranged in any other suitable configuration. In a specific example, the card reader has a thickness of 6.7 mm at the magnetic reading head, including the carriage and support arm.

Figure 23:
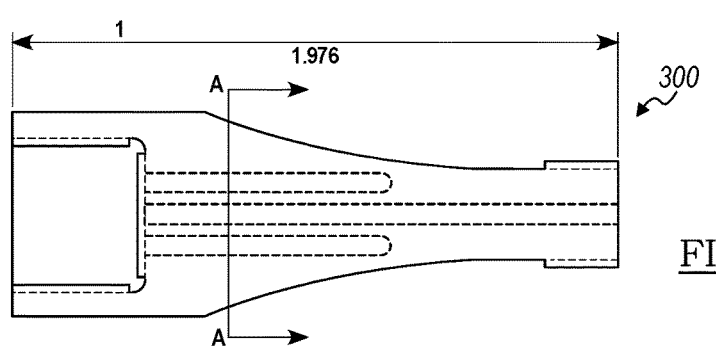
FIG. 23 is a schematic representation of the second broad face of the specific example of the support arm.
Figure 24:
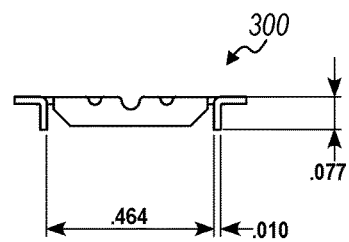
FIG. 24 is a schematic representation of the second end of the specific example of the support arm.

The support arm 300 preferably includes a body 390 extending between a first end 320 and a second end 340, and can additionally include a set of adjustment features 310, define a central longitudinal axis 301, or include any other suitable feature. However, the support arm can include any other suitable set of components. The support arm preferably defines a longitudinal axis (e.g., along its length), a lateral axis (e.g., along its width), and a thickness, but can alternatively include any other suitable set of dimensions or references. In a specific example, as shown in FIGS. 23 and 24, the support arm is made from a sheet of material 0.10 inches thick, and is 1.976 inches in length, 0.464 inches in width, and 0.077 inches in height.

The body 390 of the support arm 300 functions as a lever arm to accommodate for insertion forces and to bias the magnetic reading head against the card. The body preferably remains substantially free of the carriage (e.g., not directly physically mounted to the carriage), but can alternatively be coupled to the carriage along all or a portion of the body length. The body of the support arm is preferably substantially flat, and defines a first broad face 360 and second broad face 380 opposing each other across the support arm thickness, but can alternatively be a cylinder, square rod, or have any other suitable configuration. The body is preferably substantially planar (e.g., substantially coplanar or parallel with the carriage), but can alternatively be cambered (e.g., convex or concave toward the carriage), curved, or otherwise arranged. The body is preferably substantially straight (e.g., linear), but can alternatively be serpentine or have any other suitable profile along the longitudinal axis. The body preferably has a substantially uniform thickness throughout, but can alternatively have a variable thickness (e.g., be thicker proximal the first end, be thicker proximal the second end, be thicker along one longitudinal side, etc.). The support arm preferably tapers from the second end toward the first end to form a neck 326, such that the width of the first end is smaller than that of the second end (e.g., wherein the second end is wider than the first end), but can alternatively have a constant width, broaden toward the first end, or have any other suitable width profile.

The first end 320 of the support arm 300 functions to mount the support arm to the carriage, and can function as a lever point, as a stress or strain transmission mechanism, or perform any other suitable functionality. In one variation, the first end is tapered, such that it is narrower than the second opposing end. In this variation, the tapered neck 326 can function to facilitate support arm torsion about the longitudinal axis. The width of the first end is preferably tapered, but the thickness of the first end or any other suitable dimension of the first end can alternatively be tapered. In a second variation, the first end can include one or more tabs (e.g., extending toward the first face, second face, extending outward, etc.) that can function as support arm gripping or retention points during assembly. However, the first end can include any other suitable feature.

Figure 9:
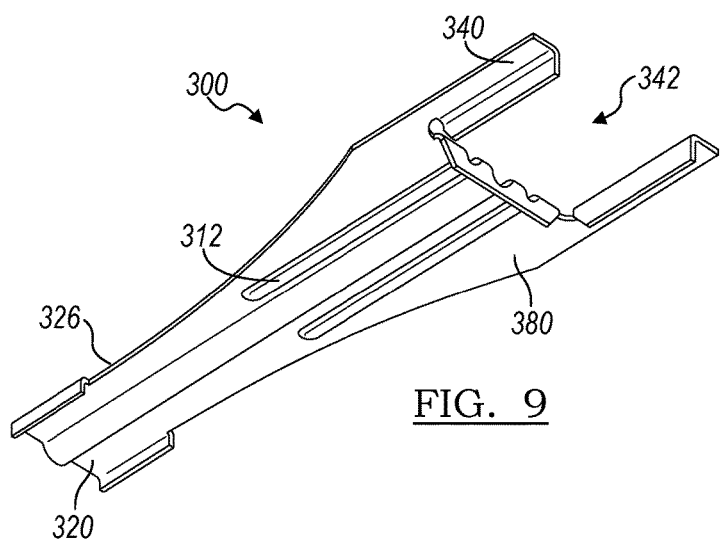
FIG. 9 is a perspective view of a first variation of the support arm from the second broad face of the support arm.
Figure 10:
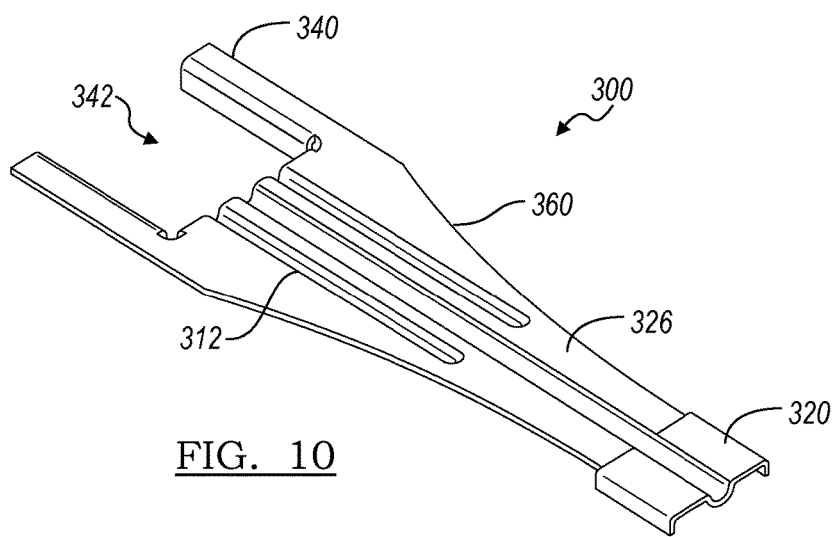
FIG. 10 is a perspective view of the first variation of the support arm from the first broad face of the support arm.
Figure 11:
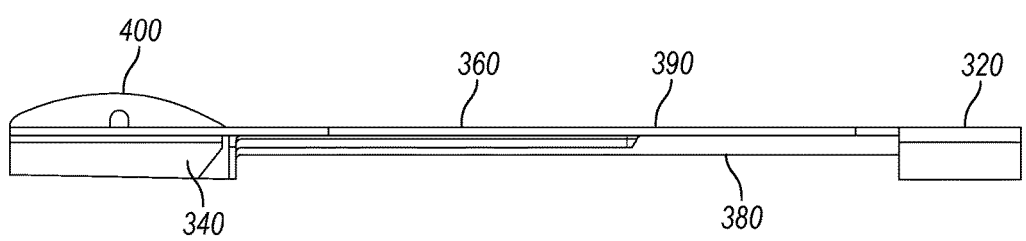
FIG. 11 is a side view of the first variation of the support arm with a magnetic reading head.
Figure 12:
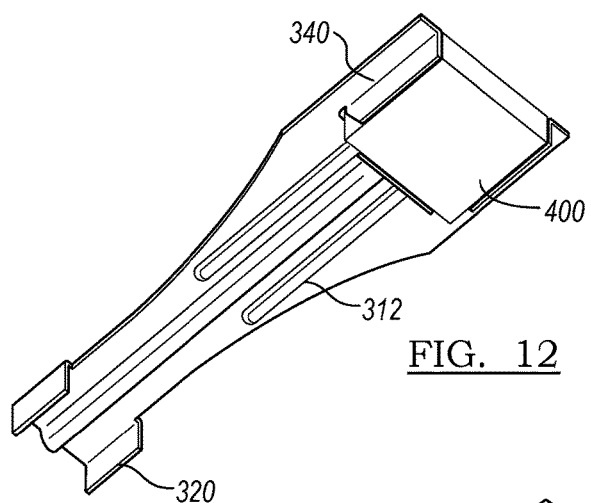
FIG. 12 is a perspective view of the first variation of the support arm from the first broad face of the support arm.
Figure 13:
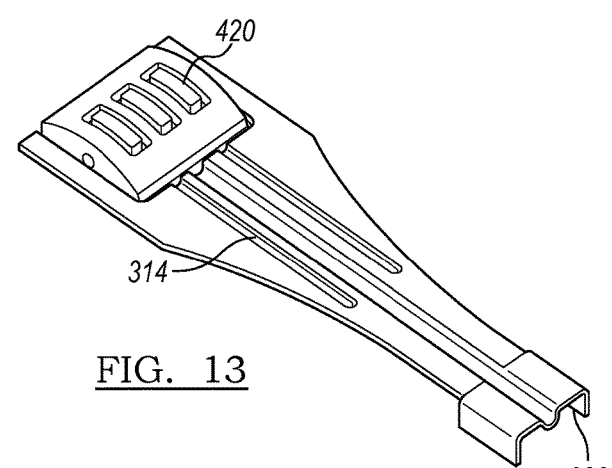
FIG. 13 is a perspective view of the first variation of the support arm from the second broad face of the support arm.

The second end 340 of the support arm 300 functions to support the magnetic reading head 400. The second end of the support arm is preferably substantially free of the carriage (e.g., not directly physically mounted to the carriage), but can alternatively be mounted to the carriage or otherwise arranged. In one variation, as shown in FIGS. 9 and 10, the second end of the support arm can include a cutout to define a fork 342, wherein the fork defines a mounting region configured to receive (e.g., mount) the magnetic reading head (as shown in FIGS. 11, 12, and 13). The cutout can be arranged along the width of the second end (e.g., such that the fork tines or legs extend parallel to the longitudinal axis of the support arm), along the length of the second end (e.g., such that the fork tines or legs extend parallel to the lateral axis of the support arm), or be arranged along any other suitable portion of the support arm. The fork is preferably centered about the central longitudinal axis of the support arm, but can alternatively be offset from the central longitudinal axis, or arranged in any other suitable location. The cutout dimensions are preferably substantially similar to (e.g., slightly larger or smaller than) the magnetic reading head dimensions, but can alternatively be different. In one variation, fork entirely encloses three sides of the magnetic reading head profile, wherein the fork base encloses the trailing edge and the fork tines or legs extend along the side edges. In a second variation, the fork partially encloses three sides of the magnetic reading head profile (e.g., encloses the magnetic reading head along its width, but the fork tines only extend partway along the magnetic reading head length). In a third variation, the cutout is in the body of the support arm proximal the second end, such that the support arm encloses four sides of the magnetic reading head profile. However, the support arm can be mounted to a broad face of the magnetic reading head (e.g., wherein the magnetic reading head is mounted to the first broad face of the support arm), mounted to a single side of the magnetic reading head, or otherwise mounted to the support arm. The second end can additionally include one or more tabs (e.g., extending toward the first face, second face, extending outward, etc.) that can function as support arm gripping or retention points during assembly with the magnetic reading head (example shown in FIGS. 9, 10, and 11). The tabs, when bent, can additionally function to reduce burrs (e.g., when the support arm is stamped) that can short or otherwise interfere with magnetic reading head operation. However, the second end can include any other suitable feature.

The adjustment features 310 of the support arm 300 function to alter the mechanical properties of the support arm. Adjustment features can include strengthening features, stress concentration features (e.g., notches, linear cutouts), stress reduction features, or include any other suitable set of features. The adjustment features can adjust the spring constant of the support arm, the deflection location on the support arm, the insertion force for card insertion, the extraction force for card extraction, the support arm durability, or adjust any other suitable support arm parameter. The adjustment features can be defined by the body of the support arm itself, or be defined by a separate component assembled to the support arm. For example, strengthening features can include channels stamped into the body of the support arm, or include bars welded or otherwise attached to the support arm. Examples of adjustment features include: longitudinal channels (e.g., defined by the body), lateral channels, channels at an angle to the lateral or longitudinal body axis, serpentine channels, slots cut partway or entirely through the body thickness (e.g., lateral, longitudinal, angled, in any other suitable orientation), reinforcement bars, notches in the body side (e.g., lateral, longitudinal, etc. with any suitable set of angles or radii), protrusions extending at a non-zero angle (e.g., perpendicular to, at any other suitable angle to) from a body broad face, or include any suitable adjustment feature.

In one variation, as shown in FIGS. 9 and 10, the support arm 300 can include a set of strengthening channels 312 configured to adjust the support arm spring constant. Each channel defines an opening 314 and a root opposing the opening, with a throat defined therebetween. The channels are preferably stamped into the sheet forming the support arm body, such that the channels are concave on one broad face and convex on the other, but can alternatively be defined into the thickness of the support arm body (e.g., be concave along one broad face and flat on the other), or be otherwise defined. The channel cross-section is preferably curved, but can alternatively be rectangular, polygonal, or otherwise shaped. When the channel defines a polygonal cross-section, the corners are preferably arcuate (e.g., rounded, radiused), but can alternatively be sharp. The channels are preferably linear and extend along the longitudinal axis of the support arm and/or in parallel with the card insertion vector or card reading vector, but can alternatively be curved or otherwise configured. However, the channels can have any other suitable configuration.

When the support arm 300 includes multiple strengthening channels, the multiple strengthening channels can have the same configuration or different configurations. The openings of the multiple strengthening channels are preferably defined along the same broad face of the support arm, but can alternatively be defined on different faces. The multiple strengthening channels are preferably substantially evenly distributed about the support arm, but can alternatively be unevenly distributed.

Figure 21:
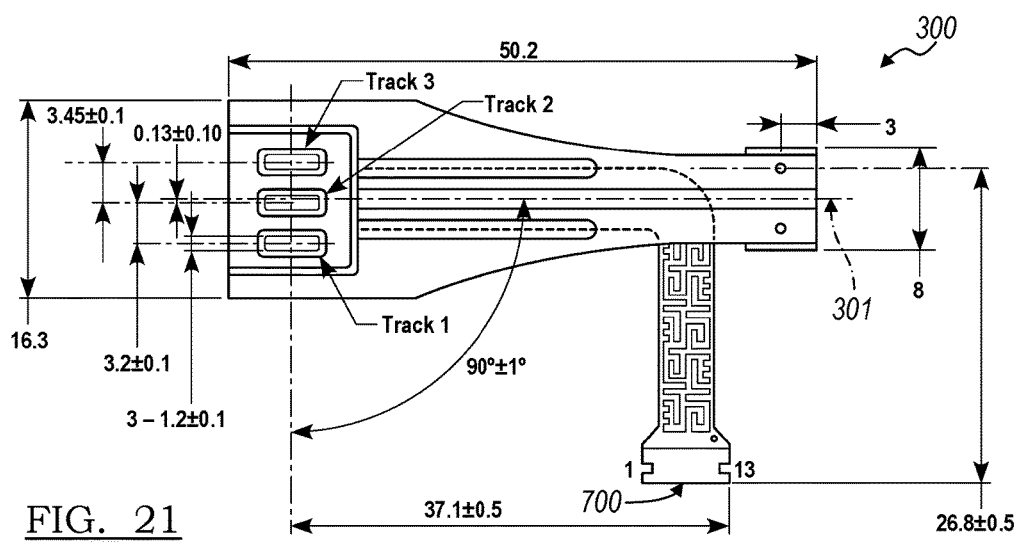
FIG. 21 is a schematic representation of the first broad face of a specific example of the support arm with a magnetic reading head.
Figure 22:
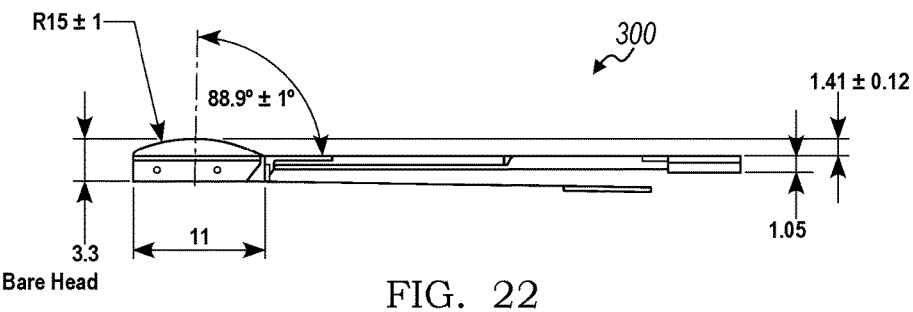
FIG. 22 is a schematic representation of the side of the specific example of the support arm with a magnetic reading head.
Figure 25:
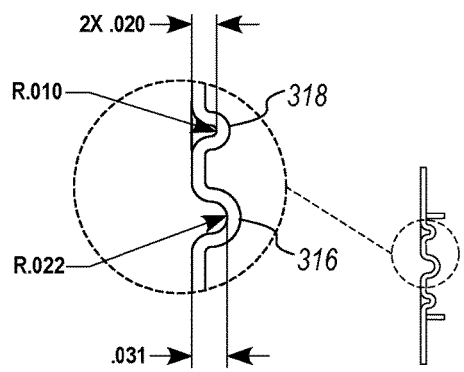
FIG. 25 is a schematic representation of the strengthening channels of the specific example of the support arm.

For example, as shown in FIG. 21, the support arm 300 can include three strengthening channels, including a central channel 316 and a pair of secondary channels 318. The openings of all three channels are defined along the same broad face (e.g., the first broad face, the face distal the magnetic reading head tracks, the face proximal the tracks, the second broad face, etc.), and the roots of all three channels (e.g., the convex portion) are defined along the same broad face (e.g., broad face opposing that in which the openings are defined). However, the openings can be defined on opposing faces, or be otherwise arranged. All three strengthening channels can have arcuate cross sections. In a specific example, as shown in FIG. 25, the central channel has a cross section with a 0.022 inch radius, and each channel of the secondary channel pair has a cross section with a 0.010 inch radius, wherein the central channel has a depth of 0.031 inches (inclusive of material thickness) and the secondary channel has a depth of 0.020 inches (inclusive of material thickness). The central channel can be arranged substantially coaxially with the support arm central longitudinal axis, while the pair of secondary channels can be evenly arranged on either side of the central channel, such that the central channel is interposed between the pair of secondary channels. The central channel can extend along substantially the entirety of the support arm length (e.g., extend from the first end to the second end, to the base of the fork in the second end, etc.), while the secondary channels can extend along a portion of the support arm length (e.g., extend from the base of the fork in the second end to the middle of the neck, or extend along any other suitable portion of the support arm). In one variation, each channel is substantially aligned with a track of the magnetic reading head (e.g., wherein different channels are preferably aligned with different tracks, but can alternatively share a track). In a specific example, the central channel can be substantially aligned with the central track of the magnetic reading head, while the first and second channel of the secondary channel pair are each substantially aligned with the first and third tracks of the magnetic reading head, respectively. The support arm is preferably mounted with the channel openings proximal the carriage (e.g., facing the carriage), but can alternatively be mounted with the openings distal the carriage or be mounted with the channel openings arranged in any suitable configuration.

In one variation in which the support arm 300 is stamped from metal (e.g., stainless steel, such as stainless steel SU301, copper alloy, aluminum alloy, gold alloy, etc.), the body is preferably manufactured with the grain direction substantially aligned with the longitudinal axis and the features stamped from the first broad face (e.g., face proximal the magnetic reading head tracks), such that the burr direction is toward the second broad face (e.g., to prevent burrs on the first broad face, which can prevent shorting or other interference with the magnetic reading head performance).

The magnetic reading head 400 of the card reader 100 functions to read information from the magnetic stripes on cards (e.g., payment cards, gift cards, etc.). The magnetic reading head can be a transducer that converts magnetic fluctuations to electrical signals, but can alternatively be any other suitable head capable of reading information that is magnetically stored. Alternatively, any other suitable reading head, capable of reading any other suitable type of information from any other suitable media, can be used in lieu of the magnetic reading head. The card reader preferably includes a single magnetic reading head, but can alternatively include any suitable number of magnetic reading heads. The magnetic reading head is preferably mounted to the support arm, more preferably statically mounted to the second end of the support arm (e.g., the end opposing the end mounted to the carriage) but alternatively be actuatably mounted or mounted to any other suitable portion of the support arm. Alternatively, the magnetic reading head can be suspended (e.g., by a spring) from the casing, or be otherwise arranged.

The support arm and magnetic reading head are preferably mounted with the leading edge of the magnetic reading head (e.g., the edge of the magnetic reading head distal the first end of the support arm) arranged proximal (e.g., abutting) the card opening, but can alternatively be mounted with the leading edge of the magnetic reading head proximal (e.g., abutting) the carriage opening, mounted with the trailing edge of the magnetic reading head proximal (e.g., abutting) the carriage opening, or arranged in any other suitable location relative to the carriage or casing. The second end of the support arm (and magnetic reading head) can be contained within the boundaries of the carriage, protrude beyond the carriage boundaries (e.g., wherein the second end can cooperatively form the carriage opening or card opening), protrude beyond the carriage opening, protrude beyond the card opening, or be otherwise arranged. The support arm (and associated magnetic reading head) are preferably mounted to the first broad face of the carriage (e.g., exterior of the first carriage component) with the first broad face of the support arm and/or tracks 420 of the magnetic reading head arranged proximal (e.g., facing) the second broad face of the carriage, the second carriage component, the card receptacle, the card opening, and/or the carriage opening. However, the support arm and magnetic reading head can be otherwise arranged. In a specific example, the support arm and magnetic reading head are mounted with the leading edge proximal the card opening and the trailing edge substantially aligned with or proximal to the top of the ramp. However, the support arm and magnetic reading head can be otherwise arranged.

The magnetic reading head 400 preferably includes a body and a set of tracks 420 arranged on the body, but can alternatively include any other suitable component. The body functions to support the tracks, and to mount the tracks to the support arm. The body preferably defines a first and second broad face, wherein the first and/or second broad face can be planar, curved (e.g., convex or concave), or otherwise configured. The body additionally defines a profile, wherein the profile can be rectangular (e.g., four-sided, square, etc.), polygonal, circular, or have any other suitable shape. The profile preferably includes a first edge (leading edge) and a second edge (trailing edge) aligned along the track axis or card insertion vector. The first and second edge can be perpendicular or at any other suitable angle to the track axis or card insertion vector.

The tracks 420 function to read information from the magnetic stripe. The tracks preferably define a reading axis (track axis), wherein the reading axis preferably extends parallel to the track longitudinal axis, but can alternatively extend perpendicular the track longitudinal axis, or in any other suitable direction. Each magnetic reading head can include one or more tracks. In one variation, the magnetic reading head includes three tracks, arranged equidistant from each other. In a second variation, the magnetic reading head includes two tracks. In a third variation, the magnetic reading head includes a single track. However, any other suitable type of magnetic reading head can be used. The tracks are preferably arranged on the same broad face of the magnetic reading head, but can alternatively be arranged on different faces of the magnetic reading head.

In a specific example, the magnetic reading head 400 includes multiple tracks arranged on the same broad face (first broad face of the magnetic reading head). The magnetic reading head is mounted to the second end of the support arm (e.g., the free end of the support arm), with the tracks proximal the first broad face of the support arm (e.g., wherein the normal vectors of the first broad face of the support arm and first broad face of the magnetic reading head are substantially parallel and codirectional). The support arm preferably includes a strengthening feature (e.g., strengthening channel) for each track, wherein each strengthening feature is substantially aligned with the respective track, but can alternatively include any suitable number of adjustment features arranged in any suitable distribution. The second end of the support arm preferably defines a fork that encompasses the entirety of three edges of the magnetic reading head (e.g., the trailing edge and sides), but can alternatively encompass the entirety of a full side (e.g., the trailing edge) and part of the side edges, the entire profile of the magnetic reading head, or extend over any suitable portion of the magnetic reading head. The fork can encompass all or a portion of the magnetic reading head thickness. In one variation, the interior of the fork of the support arm includes tabs bent toward the second broad face of the support arm, which function to retain the sidewalls of the magnetic reading head. The magnetic reading head is preferably epoxied to the support arm, but can alternatively be otherwise mounted to the support arm.

Figure 7:
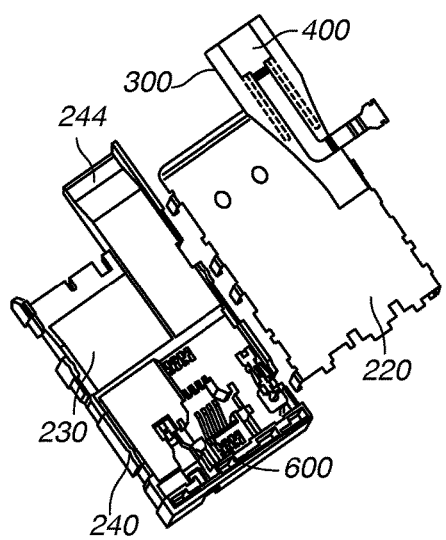
FIG. 7 is an exploded view of a fourth variation of the card reader from the first broad face.
Figure 8:
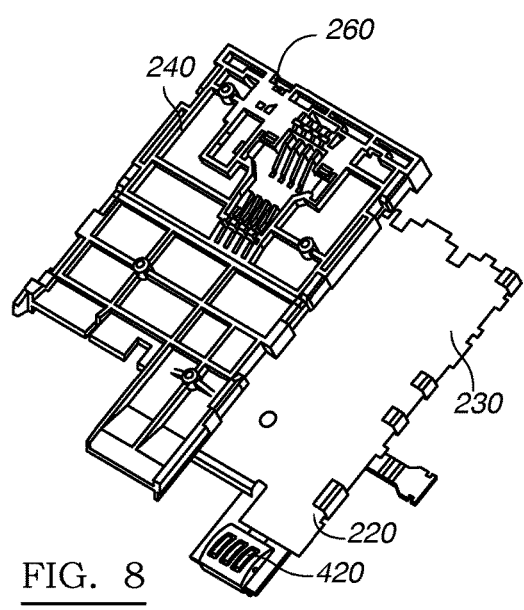
FIG. 8 is an exploded view of the fourth variation of the card reader from the second broad face.

As shown in FIG. 7, the ramp 244 of the card reader 100 functions to bias the card against the magnetic card reader during insertion. The ramp is preferably defined by the carriage, and opposes the tracks of the magnetic card reader. In a specific variation, the ramp can be defined in the interior face of the second carriage component extension, opposing the support arm and/or magnetic reading head. However, the ramp can be otherwise arranged. The ramp preferably defines a foot, a rise, and a top, wherein the foot is preferably arranged proximal the card opening and the top proximal the carriage body or carriage opening. However, the ramp can be otherwise defined.

Figure 15:
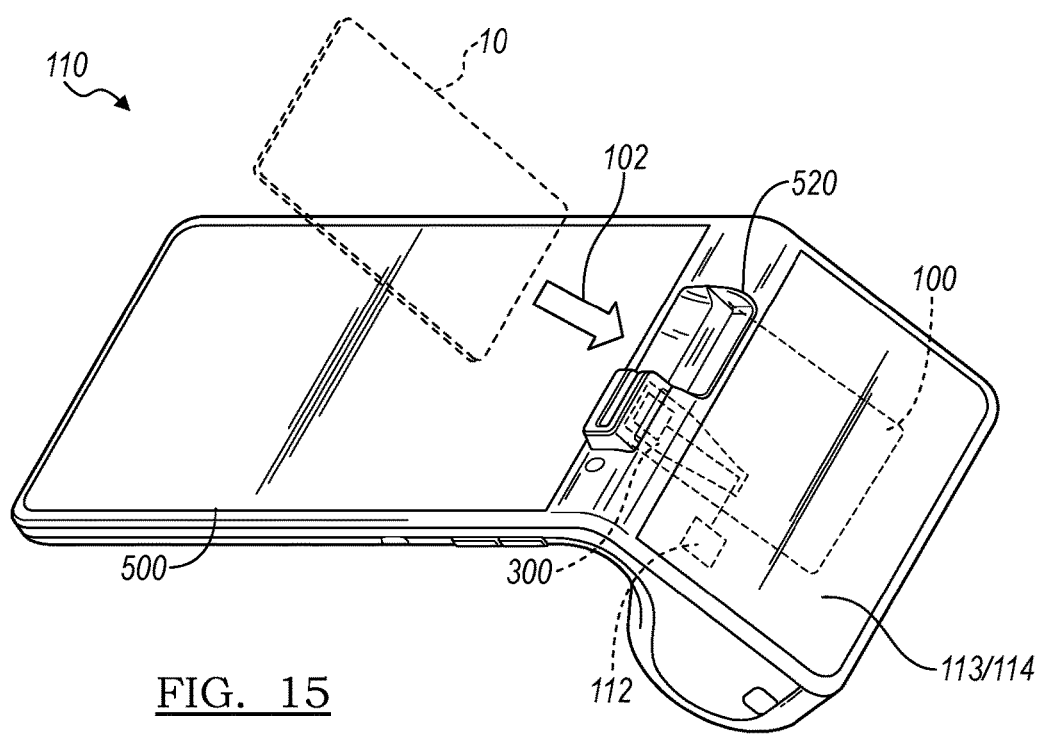
FIG. 15 is a schematic representation of a first variation of a point of sale system incorporating the card reader.
Figure 16:
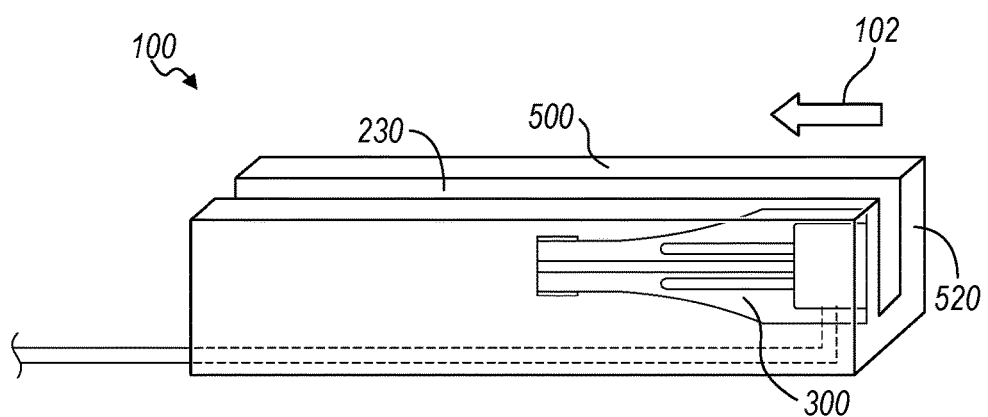
FIG. 16 a schematic representation of a second variation of the card reader.
Figure 17:
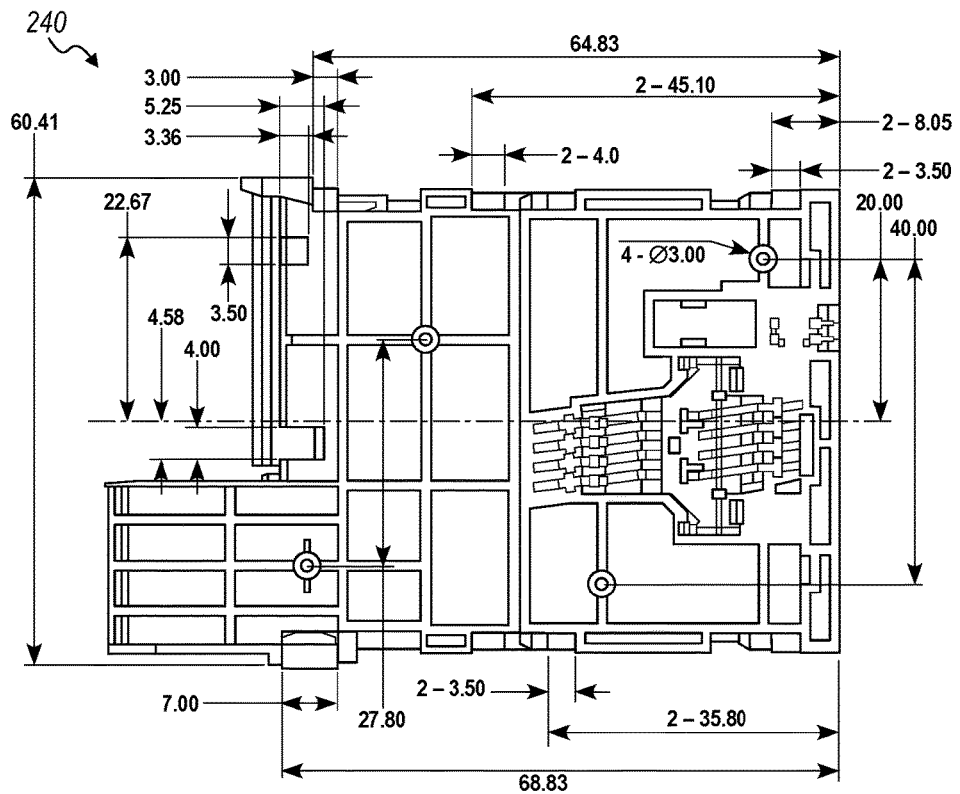
FIG. 17 is a schematic representation of the second carriage component of a specific example of the card reader.
Figure 18:
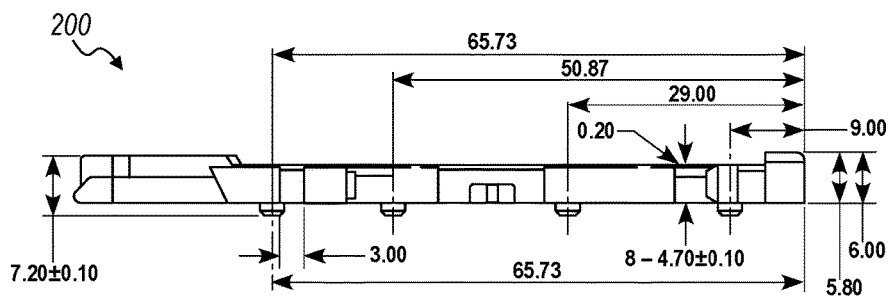
FIG. 18 is a schematic representation of the side of a specific example of the card reader.
Figure 19:
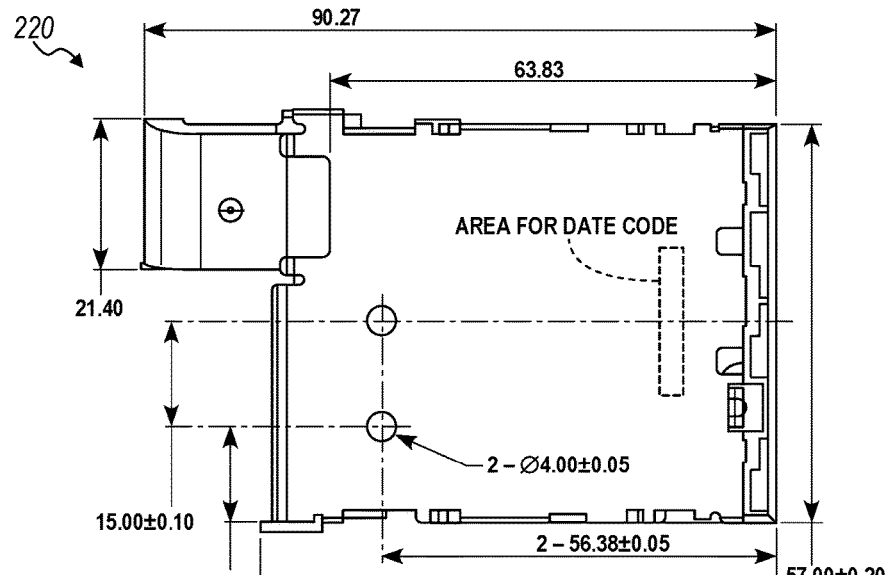
FIG. 19 is a schematic representation of the first carriage component the specific example of the card reader.
Figure 20:
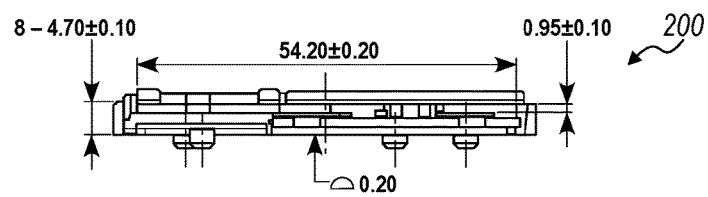
FIG. 20 is a schematic representation of the card obstruction end of the specific example of the card reader.

As shown in FIGS. 15 and 16, the housing 500 of the card reader 100 and/or point of sale system 110 functions to enclose and mechanically protect the card reader components. The housing can additionally function to limit the amount of support arm deflection away from the carriage (e.g., wherein the housing extends parallel the support arm, along the second broad face of the support arm or card reader face, wherein the housing distance from the support arm is selected to control support arm deflection). The housing can additionally define a card opening 520 and/or card insertion vector, wherein the card opening can be arranged at a non-zero angle to a carriage longitudinal axis or card insertion vector (e.g., perpendicular to the carriage longitudinal axis or card insertion vector, parallel to the longitudinal axis or card insertion vector, or arranged in any suitable configuration. The housing can additionally define a card track contiguous with the card opening. The housing can additionally define a magnetic reading head opening, such that the tracks of the magnetic reading head are exposed to the card receptacle, card track, and/or card opening (e.g., such that the magnetic reading head to card contact is unobstructed). However, the housing can perform any other suitable functionality. The housing is preferably made of plastic, but can alternatively be made of any other suitable material.

The card reader 100 can additionally include an integrated circuit chip reader 600 (IC chip reader), which functions to read information from integrated circuit chips (IC chips), such as EMV chips (e.g., ISO/IEC 7816-compliant or ISO/IEC 14443-compliant chips or cards), smartchips, or any other suitable IC chip. The IC chip is preferably mounted on the inserted card, but can alternatively be otherwise provided. The IC chip reader can additionally function to provide power to the IC chip. The IC chip reader preferably includes a plurality of sprung pins connected to a processor (e.g., external or included within the card reader), but can alternatively include any other suitable reader. The IC chip reader is preferably mounted to the second carriage component (e.g., mounted to the side of the carriage opposing the support arm mounting face), but can alternatively be mounted on the same side or on any other suitable portion of the carriage. The IC chip reader is preferably mounted along the body of the carriage, but can alternatively be mounted along an edge or along any other suitable portion of the carriage. The IC chip reader is preferably arranged proximal the second end of the carriage (e.g., proximal the card obstruction end), but can alternatively be arranged proximal the carriage opening or arranged in any other suitable position. The IC chip reader is preferably operated when the card detection pin is triggered (e.g., actuated), but can alternatively be operated in response to card translation past the IC chip reader, or be operated at any other suitable time.

Figure 6:
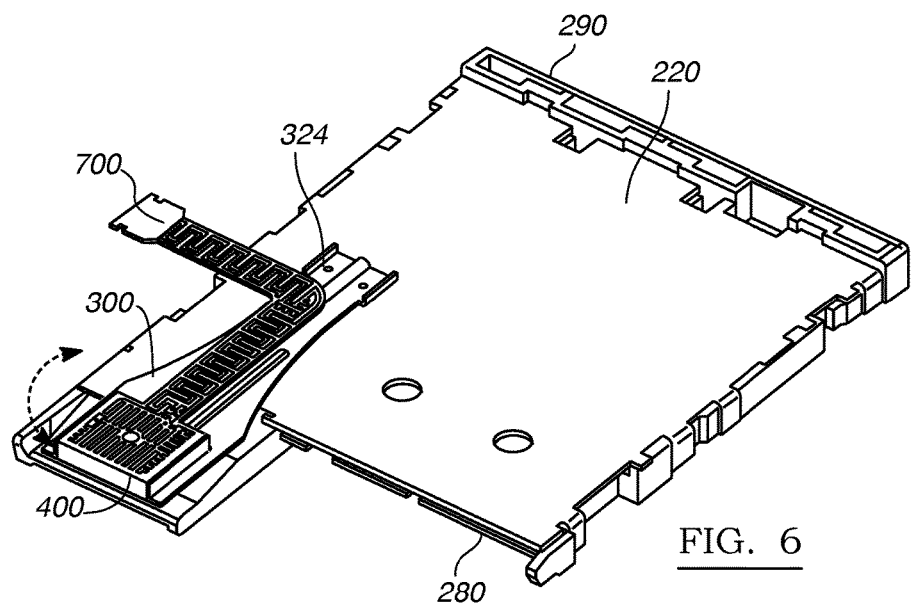
FIG. 6 is a perspective view of a third variation of the card reader, including a flex cable.
Figure 14:
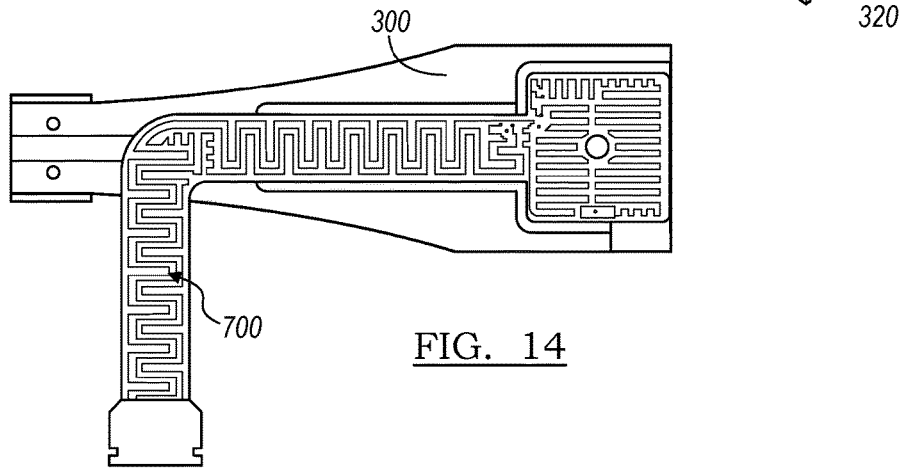
FIG. 14 is a view of a second variation of the support arm with a magnetic reading head and flex cable from the first broad face.

The card reader 100 can additionally include flex cable 700 that functions to electrically connect the magnetic reading head to a processor (example shown in FIG. 14). The flex cable can additionally or alternatively electrically connect the IC chip reader to a processor. The flex cable preferably extends from the magnetic reading head, along the support arm length, and along a portion of the carriage broad face proximal the support arm first end (e.g., proximal the mounting point 322). As shown in FIG. 6, the flex cable preferably covers the entirety of the magnetic reading head and/or IC chip reader distal the respective active surfaces (e.g., tracks and pins, respectively), but can alternatively be otherwise arranged relative to the information reading heads. The flex cable is preferably statically mounted to the reading head (e.g., epoxied to the reading head) and free from the support arm, but can alternatively be statically mounted to the support arm or otherwise retained. The flex cable can be planar and be Z-shaped, L-shaped, or have any other suitable configuration. In one variation, the flex cable includes an elbow or other transition to avoid the mounting point 322 on the support arm first end (e.g., the welding points), which can function to facilitate easier support arm assembly to the carriage.

The flex cable 700 can additionally include a security mesh that functions to prevent information extraction from the flex cable or reading heads. The security mesh can be an analog security mesh, digital security mesh (e.g., a chip), or include any other suitable security measure. The security mesh preferably encloses the flex cable, but can alternatively cover a portion of the flex cable (e.g., the exterior face) or cover any other suitable portion of the flex cable. The security mesh can additionally extend over the reading heads or along any other suitable portion of the card reader.

In one variation, as shown in FIG. 15, the card reader 100 can be incorporated into a point of sale system 110 (POS system), the POS system can include a secure processor 112, input 114 (e.g., touchscreen), and output 113 (e.g., display). Examples of the POS system include the POS systems disclosed in U.S. application Ser. No. 14/743,356 and/or U.S. application Ser. No. 14/526,112, but can alternatively include any other suitable POS system. The secure processor (e.g., secure processing chip) is preferably electrically connected to the magnetic reading head and/or IC chip reader, but can be otherwise connected to the card reader. The hardware and/or software of the secure processor can be standard-compliant, wherein any changes to the hardware and/or software require recertification. Alternatively, the secure processor can be unsecured (e.g., freely updated), or be any other suitable processor. The input and display are preferably associated with each other, such that a user input received on the input performs an action corresponding to the graphics displayed on the display (e.g., the input can be used to select a graphic on the display, which is read as a user input). In this variation, the card reader is preferably arranged parallel the display or input (e.g., behind the display or input, with the chassis broad face or support arm broad face substantially parallel to the display broad face, etc.), but can alternatively be arranged in any other suitable configuration relative to the display broad face. In example, the card reader can be arranged with the carriage opening or card opening extending along a sidewall of the display. However, the card reader can be otherwise arranged.

In a specific example of card reader manufacture, the method of manufacture includes: stamping a support arm, including adjustment features out of metal, epoxying the magnetic reading head and flex cable to the support arm second end, assembling the carriage (e.g., wherein the IC chip reader is integrated into a carriage component), aligning the support arm with a gap substantially tracing the support arm profile in the carriage, and mounting the support arm to the carriage exterior (e.g., by laser welding). The end of the flex cable can then be connected to the processor. However, the card reader can be otherwise assembled.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A low-profile card reader, comprising:
    a carriage comprising a first side opposing a second side, the first and second sides cooperatively defining:
        an open end;
        a closed end opposing the open end; and
        a card receptacle extending between the closed end and the open end;
    a single support arm, comprising:
        a first end, statically mounted to the first side of the carriage;
        a second end, free from the carriage and arranged proximal the open end;
        a body connecting the first end to the second end, wherein the body is free from the carriage, such that the support arm freely bends along a support arm length of the single support arm relative to the carriage; and
    a magnetic reading head statically connected to the second end of the support arm, the magnetic reading head comprising a set of magnetic reading head tracks; and
    an integrated chip (IC) reader mounted to the second side of the carriage proximal the closed end.

2. The low-profile card reader of claim 1, further comprising a housing defining a card opening arranged at a non-zero angle to a carriage longitudinal axis of the carriage, wherein the support arm is arranged with the support arm length parallel the carriage longitudinal axis and the second end proximal the card opening, wherein the carriage is arranged with the open end proximal the card opening and the closed end enclosed within the housing.

3. The low-profile card reader of claim 1, wherein:
    the carriage comprises a first carriage component forming the first side of the carriage and a second carriage component forming the second side of the carriage, the second carriage component opposing the first carriage component, the first and second carriage components each comprising a card opening end, the card opening ends cooperatively defining the open end therebetween, the first and second carriage components cooperatively defining the card receptacle therebetween; and
    the first end of the support arm is mounted to the first carriage component with the second end proximal the card opening end of the first carriage component, and a track of the set of magnetic reading head tracks arranged proximal the second carriage component.

4. The low-profile card reader of claim 3, wherein the card receptacle is configured to encapsulate a card along an entirety of a card width.

5. The low-profile card reader of claim 1, further comprising a card detection pin mounted to the carriage along the closed end.

6. The low-profile card reader of claim 1, wherein the support arm is arranged proximal a first edge of the carriage, the first edge extending between the open end and the closed end; and wherein the IC reader is arranged between the first edge and a second edge of the carriage opposing the first edge.

7. The low-profile card reader of claim 1, wherein the IC reader comprises a plurality of pins, the plurality of pins arranged within the card receptacle, wherein the set of magnetic reading head tracks comprises a plurality of tracks, wherein the magnetic reading head is mounted to the support arm with the tracks proximal the second side of the carriage.

8. The low-profile card reader of claim 7, wherein the magnetic reading head is a three-track head, wherein the magnetic reading head is mounted to the support arm with a central longitudinal axis of a central track aligned with a central longitudinal axis of the support arm.

9. The low-profile card reader of claim 1, wherein the second end defines a fork, the fork comprising a set of tines extending parallel the support arm length, wherein the magnetic reading head is statically mounted within the fork.

10. The low-profile card reader of claim 1, wherein the first end of the support arm is laser welded to the carriage.

11. The low-profile card reader of claim 1, further comprising a secure processing chip electrically connected to the magnetic reading head.

12. The low-profile card reader of claim 11, further comprising a flex cable electrically connecting the magnetic reading head to the secure processing chip.

13. The low-profile card reader of claim 12, wherein the flex cable further comprises an analog security mesh extending over a face of the magnetic reading head opposing the magnetic reading head tracks.

14. The low-profile card reader of claim 6, wherein the second end of the support arm protrudes beyond the open end of the carriage, and, wherein the second side of the carriage comprises an extension opposing the second end of the support arm, the extension comprising a ramp proximal the support arm.

15. The low-profile card reader of claim 1, wherein the support arm comprises a sprung support arm biased toward the second side of the carriage.

* * * * *